(12) United States Patent
Bray

(10) Patent No.: US 6,373,045 B1
(45) Date of Patent: Apr. 16, 2002

(54) HIGH SPEED OPTOCOUPLER DETECTOR

(75) Inventor: Derek Bray, Los Altos, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/342,804

(22) Filed: Jun. 29, 1999

(51) Int. Cl.[7] .............................................. H01J 40/14
(52) U.S. Cl. .................................................. 250/214 R
(58) Field of Search ........................ 250/214 R, 214.1, 250/214 AL, 214 SW; 355/208, 246

(56) References Cited

U.S. PATENT DOCUMENTS

| | | | |
|---|---|---|---|
| 3,961,898 A | 6/1976 | Neeley et al. | ............ 23/253 R |
| 4,424,440 A | * 1/1984 | Youmans | ..................... 250/206 |
| 4,762,992 A | 8/1988 | Gat et al. | .................... 250/227 |
| 5,097,293 A | * 3/1992 | Seto et al. | .................. 355/208 |
| 5,670,775 A | * 9/1997 | Abraham et al. | ....... 250/214 A |

FOREIGN PATENT DOCUMENTS

| | | | |
|---|---|---|---|
| EP | 0 036 950 | 10/1981 | ............ G06K/7/10 |
| FR | 2 568 43 | 1/1986 | ............ H04B/9/00 |
| JP | 58-215837 | 12/1983 | ............ H04B/9/00 |
| JP | 62-154928 | 7/1987 | ............ H04B/9/00 |

OTHER PUBLICATIONS

Copy of Search Report for GB Appln. No. 0014701.7; date search was completed: Oct. 24, 2000.

* cited by examiner

Primary Examiner—Frank G. Font
Assistant Examiner—Tu T. Nguyen
(74) Attorney, Agent, or Firm—Fish & Richardson P.C.

(57) ABSTRACT

The delay and distortion characteristics of an optical detector can be improved with a comparator having tailored offsets and hysteresis. The comparator is controlled by the output of a transimpedance amplifier, coupled in part through a delay mechanism. The delay mechanism provides a dynamic reference level to one terminal of the comparator.

9 Claims, 5 Drawing Sheets

HIGH SPEED OPTOCOUPLER DETECTOR

BACKGROUND OF THE INVENTION

In an optocoupler, a driver stage takes an input signal and converts it to an optical signal. The optical signal is then sensed by a detector stage which converts it back to an electrical signal. Ideally, the two stages (driver and detector) introduce little or no delay or distortion into the signal being coupled.

A detector stage offering high switching speed with minimal pulse width distortion and isolation would be highly desirable for an optocoupler. Such a detector can be fashioned with a detector responsive to changes in the output of a photo diode. A delay circuit retains the value of the detector output immediately preceding a change in the diode's output to provide a dynamic reference level against which the instantaneous output of the detector is compared.

DESCRIPTION OF THE INVENTION

Figure 1:
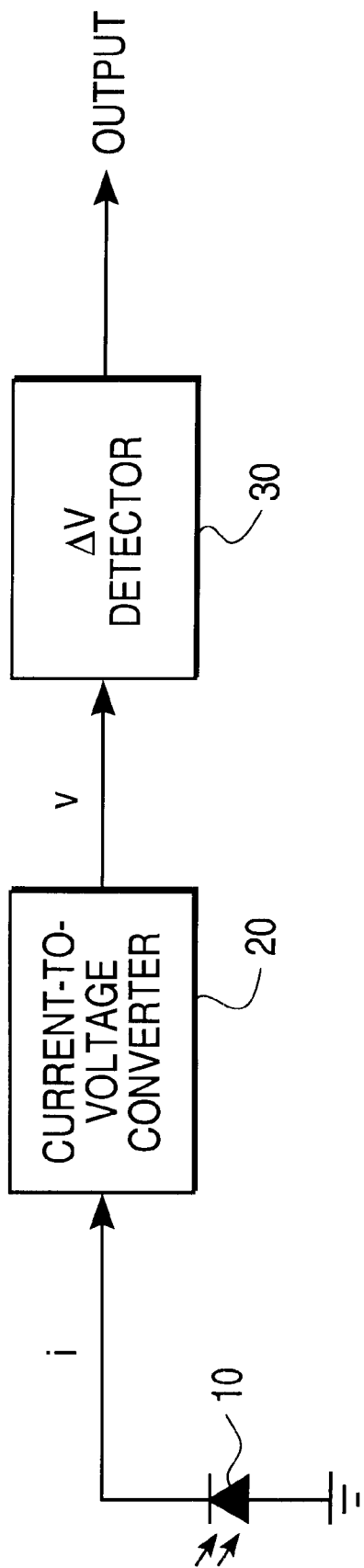
FIG. 1 is a conceptual schematic block diagram of a detector circuit.

An optical detector can be modeled as shown in FIG. 1. A photo diode 10 senses light and generates current i, which is converted to a voltage by a current-to-voltage converter 20, producing an output v. When the photo diode 10 is excited by light, a ΔV detector 30 senses a change in the output of the current-to-voltage converter 20 and the ΔV detector 30 generates an output signal, indicating the presence of an input signal, i.e., the light impinging on the photo diode 10. The ΔV detector 30 detects a change in the output voltage of the current-to-voltage converter 20 by retaining the value of voltage prior to a transition in the output of the photo diode 10 and comparing that against the output value following the transition.

Figure 2:
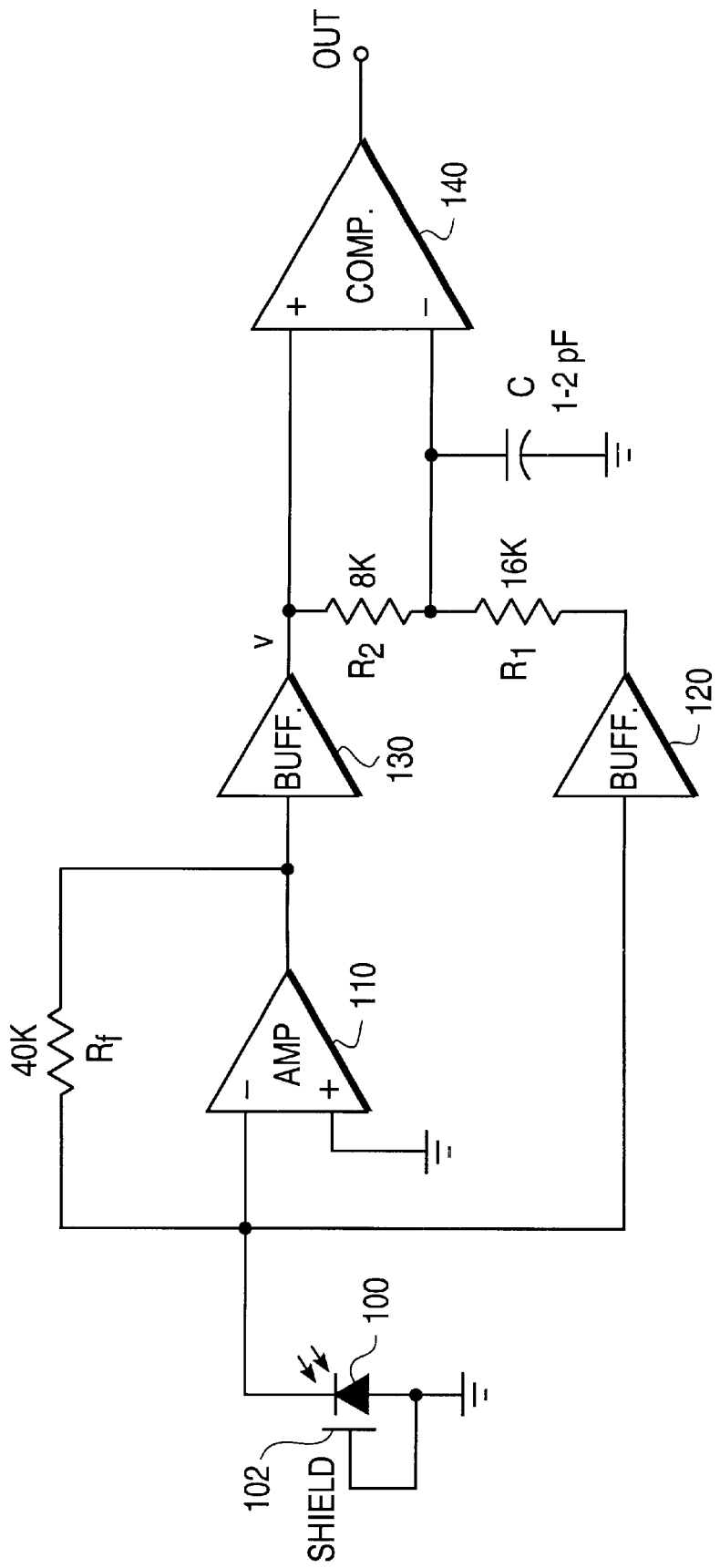
FIGS. 2 and 3 are schematic diagrams of optical detector circuits.

A circuit that achieves the foregoing is shown in FIG. 2. A photo diode 100, having an optional shield 102 for common-mode isolation, generates a current when excited by light. This current may vary from 4–40 μA, depending on the diode and the intensity of the light impinging thereon, and is sensed by the negative input of a transimpedance amplifier 110. A transimpedance amplifier uses conventional operational amplifier technology and provides the desired linearity and dynamic range. A feedback resistor $R_f$ couples the output of the amplifier 110 to the negative input to define the transimpedance gain, and the positive input is grounded.

The negative input and the output of the amplifier 110 are connected to the inputs of non-inverting unity-gain buffers 120 and 130, respectively, to provide isolation. The outputs of the buffers 120 and 130 are connected to opposite ends of a voltage divider consisting of $R_1$ and $R_2$. Although in FIG. 2 these resistors have been assigned values of 16K and 8K ohms, respectively, other values in the same or a similar ratio could have been selected. One end of the voltage divider (the output of buffer 130) is connected to the positive input of a comparator 140 while the negative input of the comparator 140 is connected to the junction of the resistors $R_1$ and $R_2$ of the divider. The negative input of the comparator 140 is also connected to a capacitor. In conjunction with the voltage divider and the capacitor, the output of the buffer 120 provides a dynamic reference level to the comparator's negative input.

Initially, no light impinges on the photo diode 100 and thus no current is generated, and the output of the transimpedance amplifier 110 is sitting at its low point. Since no current is flowing, both buffers see the same input, generate the same output, and the inputs to the comparator 140 are likewise equal and sitting at a low voltage ("off" state). In the circuit of FIG. 2, this voltage is approximately 2 volts. The output of the comparator 140 is in the low state due to offsets and hysteresis built into the design of the comparator 140.

When light strikes the photo diode 100, the diode generates a current and the output of the transimpedance amplifier 110 will rise quickly, owing to the gain dictated by the feedback resistor $R_f$. The voltage at the input to the amplifier 110 will remain low, however, because of the amplifier's low input impedance. As a result of the amplifier's output voltage appearing across the voltage divider, the voltage at the negative input of the comparator 140 will also attempt to rise to a proportional value dictated by the values of resistors $R_1$ and $R_2$. However, at the same time, the capacitor will delay any change in the voltage at the negative input to the comparator 140. Because of this relative relationship between the voltages at the inputs to the comparator and the delaying action of the capacitor, the circuit provides a dynamic reference level. Further, the divider provides a noise margin during the comparator's on-state.

Figure 5:
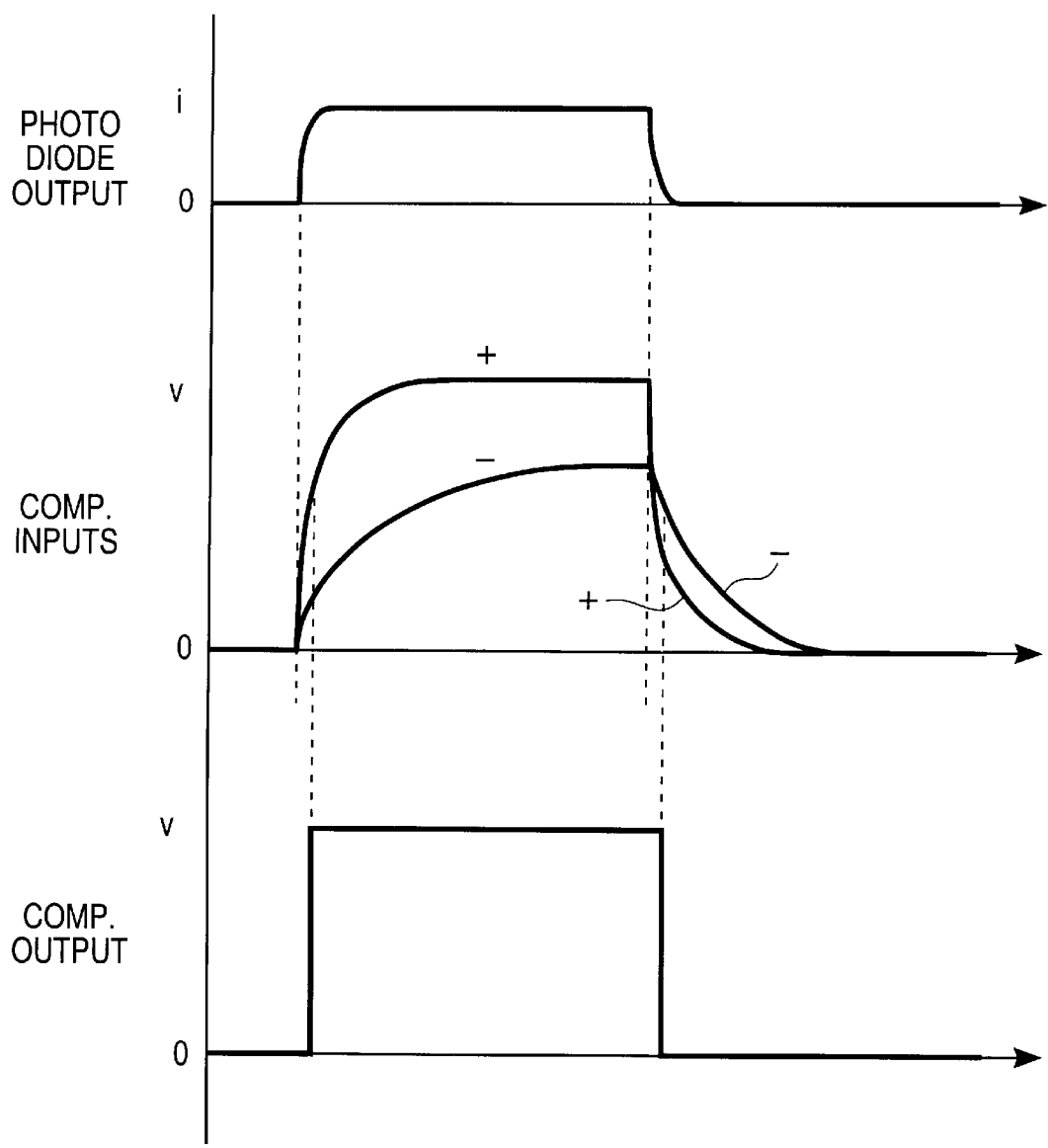
FIGS. 5 and 6 are waveform diagrams for the circuits of FIGS. 2 and 3, respectively.

Referring to FIG. 5, the output of the photo diode 100 is shown along with the voltages at the inputs and the output of the comparator 140. The voltage at the positive input achieves a higher value as shown, while the voltage at the negative input lags, but ultimately reaches a value of $v[R_1/(R_1+R_2)]$. However, as soon as the voltage at the positive input exceeds that at the negative input by the threshold of the comparator 140, the output of the comparator 140 swings high. The turn-on threshold in the comparator 140 provides a noise margin during the off-state.

When the photo diode 100 stops receiving light, the output of the transimpedance amplifier 110 will drop back to its low value (zero-current voltage) and the voltage at the positive input of the comparator 140 will similarly drop. Since the negative input is tied to a capacitor, the voltage there will now exceed the voltage at the positive input for a period determined by the value of C and $R_1$ in parallel with $R_2$, forcing the comparator 140 to switch and its output thus goes low.

In a variation of the circuit of FIG. 2, the shield 102 can be driven by a buffer amplifier to reduce the effect of the shield's inherent capacitance. Instead of tying the shield to ground, the negative input to the transimpedance amplifier 110 is connected to the input of a buffer amplifier, the output of which drives the shield 102.

Figure 3:
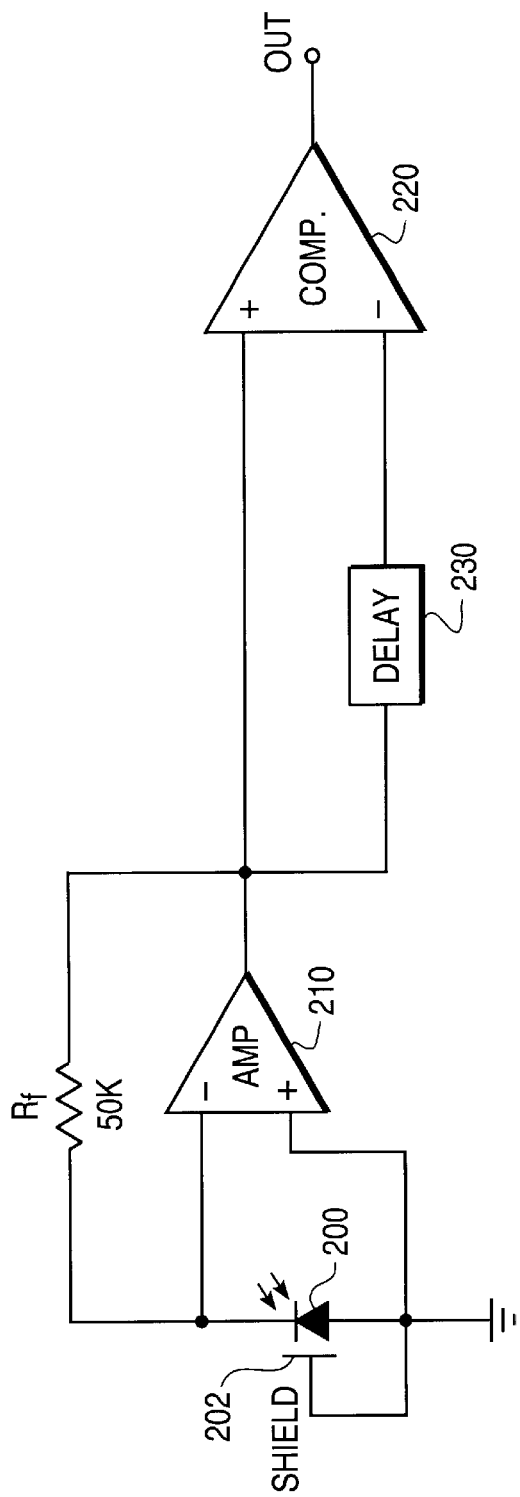
Figure 4:
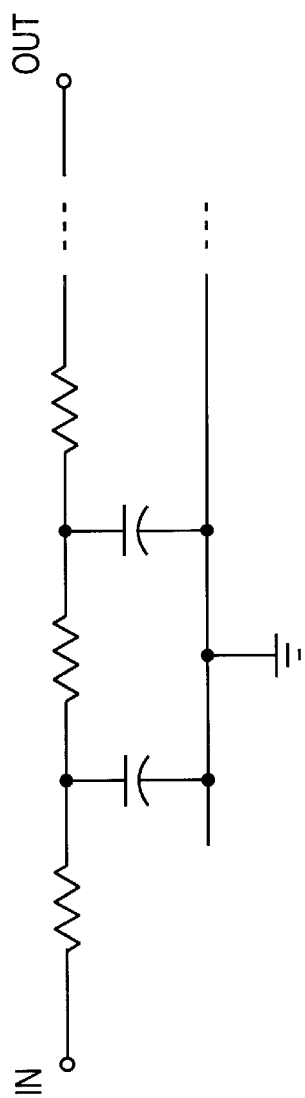
FIG. 4 is a schematic diagram of a delay circuit for the detector circuit of FIG. 3.

Another detector circuit is shown in FIG. 3. There, a photo diode 200 (and an optional shield 202) drives the negative input of a transimpedance amplifier 210 with its customary feedback resistor $R_f$ coupling the output back to the negative input as in the previous circuit. The output of the transimpedance amplifier 210 is provided to the positive input of a comparator 220 directly and to the comparator's negative input through a delay module 230. One example of a suitable delay is the RC delay line shown in FIG. 4. The resistors of the delay line may have a value of 3 KΩ while the capacitors may have a value of 10–15 fF (femtofarads; $10^{-15}$ farads), although of course other values could be selected to suit the application.

Figure 6:
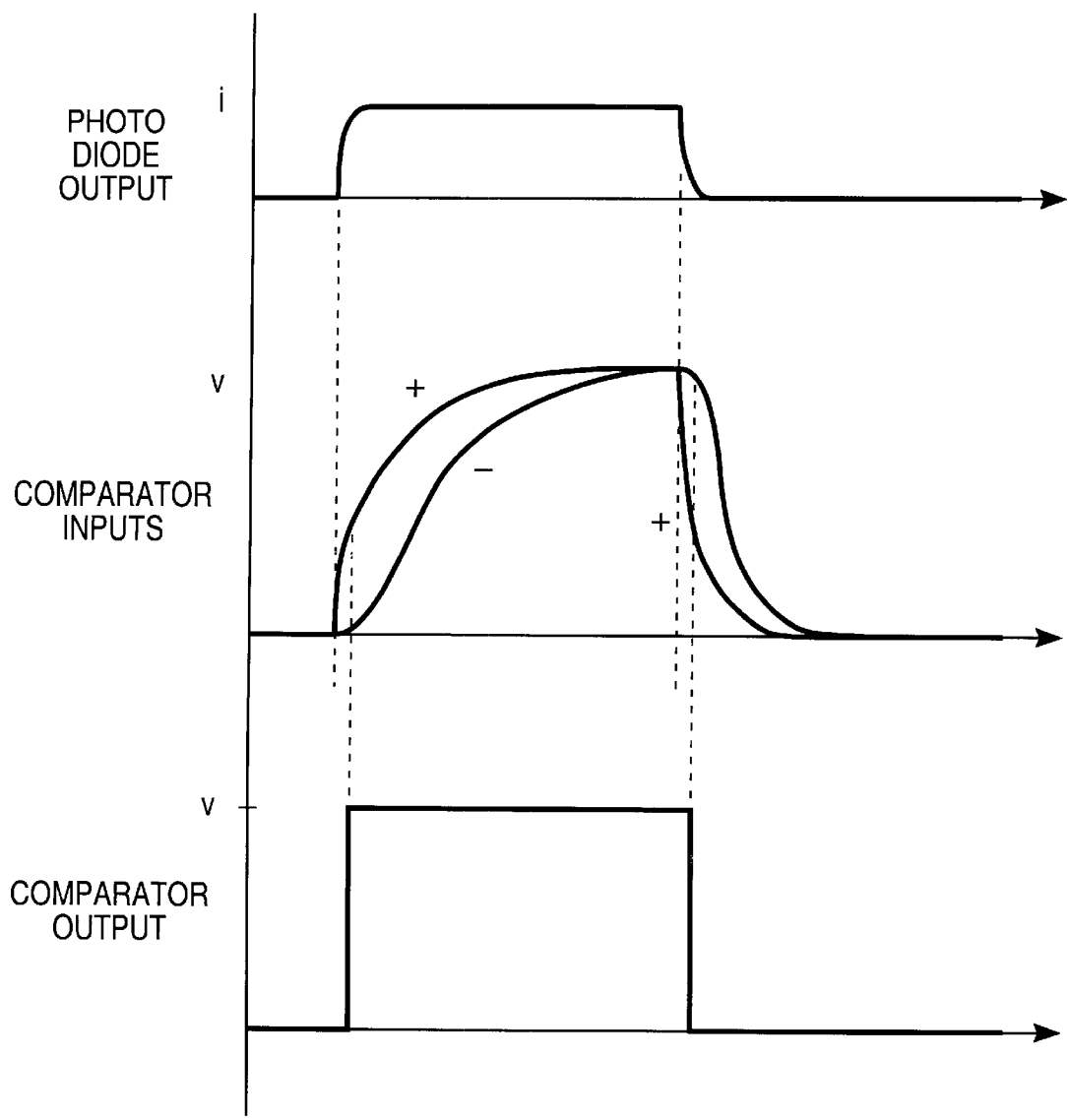

The behavior of the circuit of FIG. 3 will be explained with reference to the waveforms of FIG. 6. Initially, when the photo diode 200 is not producing any current, the output of the transimpedance amplifier 210 is low, both inputs of the comparator 220 are similarly low, and therefore its output is low due to offsets and hysteresis built into the comparator 220. When the photo diode 200 is excited, the output of the transimpedance amplifier 210 swings high, forcing the positive input of the comparator 220 high, but the delay module 230 dampens the corresponding rise of the voltage at the negative input. When the difference between the voltages at the two inputs exceeds the turn-on threshold of the comparator 220, the comparator 220 switches, producing a positive output. In accordance with the time constant of the delay module 230, the voltage at the negative terminal continues to rise, albeit more slowly, and, ultimately, the voltages at the two inputs are equal.

When light is no longer exciting the photo diode 200, current flow ceases and the output of the transimpedance amplifier 210 drops. Again, given the delay line, the voltage at the negative input remains high until it decays, allowing a difference to build quickly and forcing the comparator 220 to shift low.

Similar to the detector of FIG. 2, the circuit of FIG. 3 provides a dynamic reference level. However, since there is no voltage divider but rather a delay line, there is no voltage drop. To minimize pulse-width distortion, the comparator 220 has different turn-on and turn-off thresholds. Built-in hysteresis having different values for turn-on and turn-off can be tailored to the photo diode current rise and fall times that are typically unequal. For example, if the rise time (on time) is half that of the fall time (off time), then equal delays can be achieved by having the comparator's turn-on hysteresis twice as large as the turn-off hysteresis.

The foregoing circuits may be fabricated as integrated circuits or as discrete components. To further improve isolation, the amplifiers, buffers, comparator, and related components can be connected to an isolated supply and ground, while any interfacing circuitry on the output would be connected to an external supply and ground. In that regard, the comparator in either circuit can drive an output circuit such as a tristate or some other suitable output device.

While values have been provided in the drawings or specified in the text for some of the components, voltages, and currents, it should be recognized that other values could be selected to suit the application.

What is claimed is:

1. A detector for a photo diode, comprising:
    a current-to-voltage converter for converting the current output of a photo diode to a voltage; and
    a voltage change detector, responsive to the current-to-voltage converter, for detecting a change in the output of the photo diode, where the voltage change detector comprises means for retaining a first voltage prior to a change in the output of the photo diode and means for comparing the first voltage to a second voltage after the change.

2. A detector as set forth in claim 1, where the means for retaining the first voltage prior to a change in the output of the photo diode comprises a voltage divider for sampling a portion of the output voltage of the current-to-voltage converter and a capacitor for retaining the sampled voltage for a period of time.

3. A detector as set forth in claim 1, wherein the means for comparing the first voltage to the second voltage comprises a comparator having a first input coupled to the voltage change detector and a second input coupled to the means for retaining the first voltage prior; and
    where the means for retaining the first voltage comprises means for delaying the change in the first voltage at the comparator for a period of time.

4. A detector as set forth in claim 3, where the means for delaying the change in the first voltage at the comparator for a period of time is a delay line.

5. A detector as set forth in claim 1, where the current-to-voltage converter is a transimpedance amplifier.

6. A detector as set forth in claim 1, where the voltage change detector comprises means to an output of the current-to-voltage converter for generating a dynamic reference voltage, and a comparator having a first input coupled to the output of to the current-to-voltage converter and a second input coupled an output of the means for generating the dynamic reference voltage.

7. A detector as set forth in claim 6, where the means for generating a dynamic reference voltage comprises a voltage divider for sampling a portion of the output voltage of the current-to-voltage converter and a capacitor for retaining the sampled voltage for a period of time.

8. A detector as set forth in claim 6, where the means for generating a dynamic reference voltage comprises means for delaying the change in the reference voltage at the comparator for a period of time.

9. A detector as set forth in claim 8, where the means for delaying the change in the reference voltage at the comparator for a period of time is a delay line.

* * * * *